June 30, 1964 R. A. MORRIS ETAL 3,139,262
PRECISION METERING VALVE
Filed Dec. 12, 1961
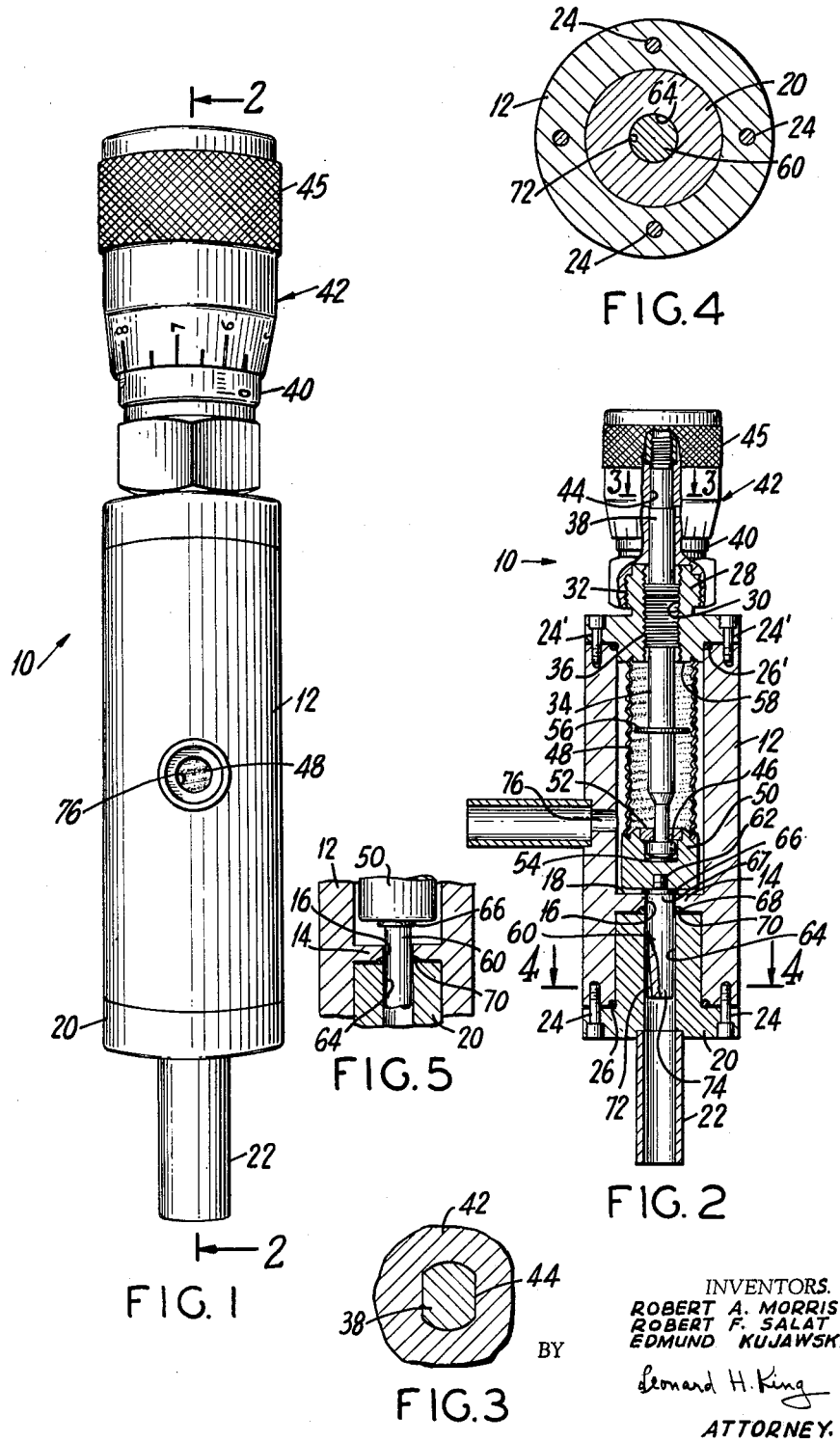
INVENTORS.
ROBERT A. MORRIS
ROBERT F. SALAT
EDMUND KUJAWSKI
BY
Leonard H. King
ATTORNEY.

3,139,262
PRECISION METERING VALVE
Robert A. Morris, Commack, Robert F. Salat, East Northport, and Edmund Kujawski, Greenlawn, N.Y., assignors to Vactronic Lab. Equipment, Inc., East Northport, N.Y.
Filed Dec. 12, 1961, Ser. No. 158,734
1 Claim. (Cl. 251—205)

The present invention relates to flow control means for metering minute amounts of gas from a high pressure to a low pressure area, as from the atmosphere into a vacuum.

A need has long existed for valve means capable of accurately controlling the entrance of minute quantities of gas into a vacuum where the quantity of gas admitted may be a fraction of a cc., or even smaller amounts approaching molecular quantities. This becomes especially difficult where the inlet port is of much higher pressure than the outlet, as where a gas at atmospheric pressure is introduced into a high vacuum. Applications of this sort may require that a preselected minute volume of gas be admitted into the vacuum chamber, the rate and volume of admission being of critical importance.

It is therefore a primary object of the present invention to provide precision control means for controlling the passage of a gas from a high pressure to a low pressure area.

A further object of the present invention is to provide means for adjusting the leak rate of a gas from a high pressure system.

Yet another object of the present invention is to provide micrometer means for manually controlling the rate of flow through a valve body with high rate of precision.

Yet a further object of the present invention is to provide improved sampling means whereby a selectable minute amount of gas may be withdrawn from a flow passage into a low pressure system.

Still a further object of the present invention is to provide improved means for precision control of the rate of flow of gases through a valve cylinder from completely shut-off condition to a full flow rate condition.

These and other objects of the present invention will be set forth in greater detail or become apparent from the following description taken in conjunction with the accompanying figures in which:

FIG. 1 is a perspective showing of the device of the present invention.

FIG. 2 is a longitudinal cross-section of the device of the present invention taken along lines 2—2 of FIG. 1.

FIG. 3 is a transverse cross-section of the device of the present invention taken along lines 3—3 of FIG. 2.

FIG. 4 is a transverse cross-section taken along lines 4—4 of FIG. 2.

FIG. 5 is a longitudinal cross-section like FIG. 2 showing a portion of the device in a valve open condition.

Referring now to the figures, the device of the present invention, characterized generally by the numeral 10, comprises a cylindrical valve body 12 formed with a transverse wall portion 14 having a flow orifice 16 therethrough. The inner face of wall 14 defines valve seat 18. Valve body 12 is closed off at one end by bottom bonnet 20 provided with nipple 22, conventional sealing means such as bolts 24 and O-ring seal 26 being employed. The other end of body 12 is closed off by top bonnet 28 having an internally threaded portion 30 and an externally threaded portion 32 employing bolts 24' and O-ring seal 26' as sealing means. Valve stem 34 has an externally threaded portion 36 adapted for threaded engagement by the top bonnet, and external portion 38 adapted to be rotated, to impart axial movement of the valve stem within the cylinder. The amount of this rotation is controllable by precision micrometer means comprising a fixed portion 40 fastened upon top bonnet 28 by threaded engagement with threads 32 of said top bonnet, and a movable portion 42 which is rigidly secured to the top of stem 34 by force fit over flat portion 44 formed on the valve stem, as shown in FIG. 3. The knurled top 45 of the micrometer unit aids in precision control of the rotation. The internal end portion 46 of stem 34 is adapted to move bellows assembly 48 axially through the valve cylinder by abutment either against plug member 50 or against lock 52, moving bellows to or fro within the valve cylinder depending on the direction of rotation of the stem. The bellows is soldered to members 28 and 50 to form a gas tight seal. Shim 54 may be conveniently inserted between the end portion 46 of the stem and plug member 50 to remove slack or play as much as possible. In the fully extended position of the bellows, plug 50 is brought into close proximity to valve seat 18. The bellows can be contracted in length to a point determined by the abutment of stop member 56 formed on valve stem 34 against inner surface 58 of top bonnet 28.

Shaft 60 is securely fastened to plug 50 by threaded screw connection 62 and extends axially through flow orifice 16 and into bore 64 of bottom bonnet 20. An O-ring 66 is frictionally fitted in annular recess 67 disposed about the base of shaft 60 at the point of juncture with plug 50 and is adapted to provide a tight seal between flow orifice 16 and valve cylinder 12 when the stem is rotated to the fully closed position. As shown in FIG. 5, O-ring 66 moves away from transverse wall 14 as the shaft is withdrawn. This is an important feature of the invention as complete shut-off of flow is assured.

Transverse wall 14 is formed with rim 68 on the external wall portion about the flow orifice. This provides a seat for a second O-ring 70 which is adapted to provide a frictional sealing fit about shaft 60 as the shaft is moved axially through the valve body. Shaft 60 is provided with a tapered groove 72 formed longitudinally on this shaft, as shown in FIG. 2. Groove 72 increases in depth at a fixed rate per unit length with the minimal depth at the base portion of the shaft, proximate to plug 50 and maximum at the terminal portion 74 of the shaft. As indicated in FIG. 4, the diameter of shaft 60 makes a close fit with bore 64 formed within bonnet 20. Thus, only tapered groove 72 provides a passage for gas entering through nipple 22. It should be particularly noted that the second O-ring 70, disposed in rim 68, is adapted to engage shaft 60 in tight frictional fit yet will not cut into the groove area, hence when the shaft is brought within the cylinder body by the rotation of stem 34, a leak passage is provided into the valve cylinder determined by the cross-sectional area of this taper 72 at the point of juncture of shaft 60 with orifice 16. Discharge port 76 is formed in valve body 12 at a point proximate to orifice 16, providing a minimal distance flow path between inlet and discharge through the valve cylinder, with the maximum distance being determined, of course, by the full open position of bellows 48 as determined by stop member 56. It should be carefully noted that the rate of groove taper per unit length is preselected to provide the desired ratio of rotation of the shaft stem to gas flow. Rotation is controlled by micrometer assembly 42. The vernier drive of the stem causes this tapered groove to pass along a sealing surface determined by O-ring 70. Therefore there is full range of control of the leak rate of gas past the sealing surface from the completely shut-off position to the full flow rate position. FIG. 5 shows the valve in an open condition. Using such full control, the present embodiment can provide adjustable flow rate from .01 cc./sec. to approximately 5 cc./sec. against a differential of atmosphere of dry air at 25° C., where the length of travel of the shaft (i.e., the length of taper) is only ½″. It may be used to adjust pressure in vacuum vessels from a low of $10^{-6}$ mm. of Hg to 1 atmosphere.

In special applications, the depth of cut of the taper may be selected to give various ratios of number of micrometer turns to the leak rate through the aperture, for example, the rate may be exponential rather than linear, if desired. Alternatively, more than one taper may be formed on the shaft for greater flow rates.

It should also be pointed out that the present invention may be incorporated into automatic control processes, wherein the valve stem is coupled to a motor or other actuating means under servo control.

There has thus been provided in accordance with the present invention means for selectively admitting a minute amount of gas into a valve cylinder, using micrometer means to adjust the rate of flow. It should be noted that the valve can easily be disassembled for inspection and cleaning, and there has been provided relative simplicity of parts consistent with the high rate of precision and efficiency achieved by the device.

There has been disclosed heretofore the best embodiment of the invention presently contemplated and it is to be understood that various changes and modifications may be made by those skilled in the art without departing from the spirit of the invention.

What is claimed is:

A precision metering valve comprising:

a valve body of generally hollow cylindrical configuration defining a valve cylinder;

a transverse wall portion having an axial bore therethrough disposed inwardly of and proximate to one end of said cylinder, said wall portion defining a vave seat, said bore defining a flow orifice, said valve body having a discharge port at one side thereof proximate to said valve seat;

a bottom bonnet adapted to close off said cylinder proximate to said valve seat and having an axial bore communicating with said flow orifice;

a top bonnet adapted to close off said cylinder at the other end thereof, said top bonnet being formed with an internally threaded bore communicating with said valve cylinder;

a valve stem having an externally threaded portion adapted to be threadedly engaged by the said internal threaded portion of said top bonnet;

an external portion extending axially outward of said cylinder and adapted to be rotated, and an internal portion adapted to be moved axially upon said rotation;

first micrometer means secured to said external stem portion;

second micrometer means secured to said top bonnet, said first and said second micrometer means being in registry and adapted to measure the amount of said axial movement of said stem;

a bellows concentric with said internal stem portion and adapted to be moved axially by said internal stem portion, said bellows provided with a plug portion disposed in confronting relation to said valve seat and adapted to abut thereon in the extended position;

a releasably secured shaft threadedly fastened to said plug portion and coaxial with said flow orifice, said shaft adapted to extend axially through said orifice and outward of said valve seat;

a first O-ring disposed about the base of said shaft at the point of juncture to said plug member in gripping relation to said shaft and adapted to seal said orifice at the position of full extension of said bellows;

a tapered groove formed longitudinally on said shaft, said groove increasing in depth at a preselected rate per unit length, with minimal depth at the base portion of said shaft, said preselected rate of taper of said groove being in preselected ratio to said micrometer means associated with the exterior portion of said stem, whereby rotation of said stem is adapted to introduce a predetermined length of shaft bearing said tapered groove into said valve cylinder;

a rim formed on the outer wall of said transverse wall portion proximate to said orifice; and a second O-ring disposed in said rim, said second O-ring adapted to abut said shaft in frictional sealing relation, wherein said tapered groove remains in the unsealed condition, to thereby define an axially tapered aperture through said inlet port.

References Cited in the file of this patent

UNITED STATES PATENTS

| | | |
|---|---|---|
| 2,670,008 | Kopp | Feb. 23, 1954 |
| 2,833,307 | Henderson | May 6, 1958 |
| 2,928,646 | Ashbrook | Mar. 15, 1960 |
| 2,929,393 | Wallace | Mar. 22, 1960 |
| 2,980,392 | Greenwood | Apr. 18, 1961 |

FOREIGN PATENTS

| | | |
|---|---|---|
| 309 | Great Britain | of 1914 |
| 463,518 | Great Britain | Apr. 1, 1937 |
| 1,077,463 | France | Apr. 28, 1954 |